US008060621B2

(12) United States Patent
Lee et al.

(10) Patent No.: US 8,060,621 B2
(45) Date of Patent: Nov. 15, 2011

(54) METHOD AND SYSTEM FOR ESTABLISHING SESSION FOR MESSAGE COMMUNICATION BETWEEN CONVERGED IP MESSAGING SERVICE CLIENT AND SHORT MESSAGING SERVICE CLIENT

(75) Inventors: Seung-Yong Lee, Seoul (KR); Kyung-Tak Lee, Yongin-si (KR); Jae-Kwon Oh, Seoul (KR); Sang-Kyung Sung, Seoul (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 386 days.

(21) Appl. No.: 11/939,013

(22) Filed: Nov. 13, 2007

(65) Prior Publication Data

US 2008/0114881 A1 May 15, 2008

(30) Foreign Application Priority Data

Nov. 13, 2006 (KR) ........................ 10-2006-0111780

(51) Int. Cl.
*G06F 15/16* (2006.01)
(52) U.S. Cl. ........................ 709/227; 709/206; 709/228
(58) Field of Classification Search .................... 709/228
See application file for complete search history.

(56) References Cited

U.S. PATENT DOCUMENTS

| 5,878,343 | A  | * | 3/1999  | Robert et al. ................. 455/424 |
| 7,058,036 | B1 | * | 6/2006  | Yu et al. ........................ 370/335 |
| 7,058,068 | B2 | * | 6/2006  | Gawargy et al. ............... 370/410 |
| 2003/0012149 | A1 | * | 1/2003  | Maggenti et al. ............. 370/260 |
| 2004/0248600 | A1 |   | 12/2004 | Kim |
| 2005/0108334 | A1 |   | 5/2005  | Tam et al. |
| 2005/0172012 | A1 | * | 8/2005  | Casati ........................... 709/220 |
| 2005/0243978 | A1 | * | 11/2005 | Son et al. .................... 379/88.13 |
| 2005/0286542 | A1 | * | 12/2005 | Shores et al. ................. 370/401 |
| 2006/0034195 | A1 | * | 2/2006  | Blaiotta et al. ................ 370/261 |
| 2006/0212525 | A1 |   | 9/2006  | Atarius et al. |
| 2007/0121596 | A1 | * | 5/2007  | Kurapati et al. .............. 370/356 |
| 2008/0123687 | A1 | * | 5/2008  | Bangalore et al. ............ 370/467 |
| 2009/0097421 | A1 | * | 4/2009  | Zhu ............................... 370/261 |

* cited by examiner

*Primary Examiner* — Yves Dalencourt
(74) *Attorney, Agent, or Firm* — The Farrell Law Firm, P.C.

(57) ABSTRACT

A converged IP messaging client transmits a session establishment request for interactive message communication. When a converged IP messaging server receives the request, it determines whether a target client of the interactive message communication uses a converged IP messaging service. If not, the converged IP messaging server transmits the session establishment request to an IWF. If it is determined that the target client is an SM client, the IWF generates an interactive message communication request by transforming a format of the session establishment request into an SMS format and transmits the interactive message communication request to the SM client. If the IWF receives an acceptance response from the SM client in response to the interactive message communication request within an effective response time, a session for the interactive message communication can be established between the converged IP messaging client and the SM client.

23 Claims, 6 Drawing Sheets

METHOD AND SYSTEM FOR ESTABLISHING SESSION FOR MESSAGE COMMUNICATION BETWEEN CONVERGED IP MESSAGING SERVICE CLIENT AND SHORT MESSAGING SERVICE CLIENT

PRIORITY

This application claims priority under 35 U.S.C. §119(a) to a Patent Application filed in the Korean Intellectual Property Office on Nov. 13, 2006 and assigned Serial No. 2006-111780, the contents of which are incorporated herein by reference.

BACKGROUND OF THE INVENTION

1. Field of the Invention

The present invention relates generally to a messaging service, and in particular, to a method and system for establishing a session for message communication between a converged Internet Protocol (IP) messaging service client and a short messaging service client.

2. Description of the Related Art

Messaging services are for providing communication between a user and a user terminal using a memory device having an accumulated transmission electronic mail box and message processing function as a type of interactive service, and includes such services as Instant Messaging (IM), Short Messaging Service (SMS), Multimedia Messaging Service (MMS) and a Push to Talk Over Cellular (PoC) service.

The IM service indicates a service of converging chatting and file transmitting/receiving functions using a specific program in an Internet environment. Recently, the development of mobile communication services allows personal mobile communication terminals, such as a cellular phone, to provide the IM service for real-time communication, which is provided by a Personal Computer (PC) via the Internet. In the PoC service, a half-duplex communication method is applied to a mobile communication service. The IM service and the PoC service are Session Initiation Protocol (SIP)-based messaging services, wherein message communication is performed by transmitting and receiving a message after establishing a session between a sending client terminal and a receiving client terminal.

For example, a process of establishing a session between two IM clients performing message communication according to the IM service will now be described. A client attempting to start message communication, i.e. an IM client A attempting to open a session, transmits an SIP INVITE message to an IM client B. The IM client B, which has received the SIP INVITE message, transmits a 200 OK message to the IM client A in response. The IM client A, which has received the 200 OK message, transmits an ACKnowledgement (ACK) message to the IM client B in response.

The SMS allows subscribers to send and receive short messages and to perform message communication without establishing a separate session. A SM client stores text input by a user in a user data portion of an SMS-SUBMIT message and transmits the SMS-SUBMIT message to an SM server. The SM server converts the SMS-SUBMIT message to an SMS-DELIVER message and transmits the SMS-DELIVER message to an SM client corresponding to a reception address. The SM client, which has received the SMS-DELIVER message, notifies of a message reception state by transmitting an SMS-DELIVERY-REPORT message to the SM server in response. Even if the SMS-SUBMIT message is converted to the SMS-DELIVER message, the text input by the user is not changed.

As described above, the messaging services use different protocols according to service types. Thus, the messaging services cannot be compatible with each other, and accordingly, a user must begin message communication only after determining whether a type of the message communication is accepted by a target client terminal. Moreover, if messaging service types supported by respective client terminals are different, it is difficult to perform message communication. For example, the IM service in which message communication begins after establishing a session cannot be compatible with the SMS in which message communication begins without establishing a session, and therefore, an IM transmitted from an IM client cannot be received by an SM client.

Thus, a new converged messaging service for converging the messaging services, such as IM, SMS, MMS and PoC services, is needed. Since a user of the converged messaging service must be able to communicate with users of the converged messaging service and users of the existing messaging services without limitation, interworking with the services such as IM, SMS, MMS and PoC must be performed. Furthermore, interworking between a messaging service in which communication is performed by establishing a session and a messaging service in which communication is performed without establishing a session must be performed.

SUMMARY OF THE INVENTION

An aspect of the present invention is to substantially solve at least the above problems and/or disadvantages and to provide at least the advantages below. Accordingly, an aspect of the present invention is to provide a method and system for establishing a session for message communication between a converged messaging service client and a Short Messaging (SM) client in a new converged messaging service of converging messaging services, such as IM, SMS, MMS and PoC services.

According to the present invention, there is provided a method of establishing a session for interactive message communication between a converged IP messaging client and an SM client in a converged IP messaging service system, the method including the converged IP messaging client transmitting a session establishment request for the interactive message communication to a converged IP messaging server, if the session establishment request is received, the converged IP messaging server determining whether a target client of the interactive message communication supports a converged IP messaging service, and if it is determined that the target client does not support the converged IP messaging service, transmitting the session establishment request to an Inter-Working Function (IWF), if the IWF, which has received the session establishment request, determines that the target client of the interactive message communication is the SM client, the IWF generating an interactive message communication request by transforming a format of the session establishment request to an SM service format, and transmitting the interactive message communication request to the SM client, and if the IWF receives an acceptance response from the SM client in response to the interactive message communication request within an effective response time, the IWF establishing a session for the interactive message communication between the converged IP messaging client and the SM client.

The method further includes, if the IWF receives a rejection response from the SM client in response to the interactive message communication request within the effective response time, the IWF notifying the converged IP messaging client and the SM client of session establishment failure.

The method further includes, if the IWF does not receive the acceptance or rejection response from the SM client in response to the interactive message communication request within the effective response time, the IWF notifying the converged IP messaging client and the SM client of session establishment failure when the effective response time elapses.

The method further includes, if the IWF receives the acceptance or rejection response from the SM client in response to the interactive message communication request after the effective response time elapses, the IWF transmitting the acceptance or rejection response to the converged IP messaging client by processing the acceptance or rejection response as a general short message.

The method further includes, if the IWF receives the acceptance or rejection response from the SM client in response to the interactive message communication request after the effective response time elapses, the IWF discarding the acceptance or rejection response.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Figure 1:
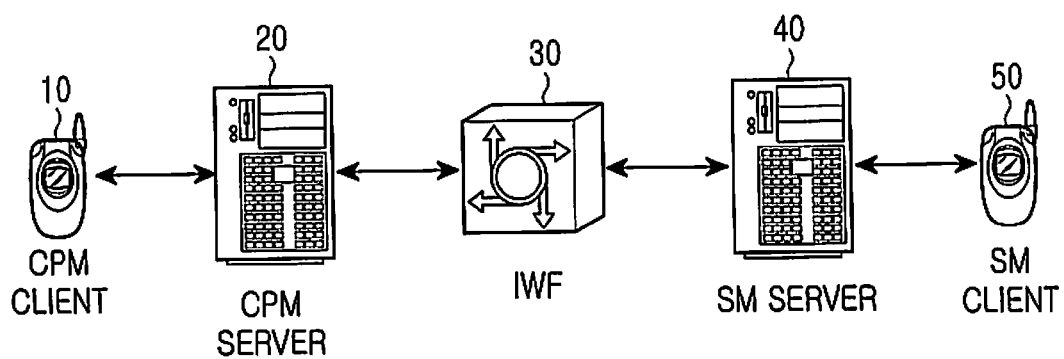
FIG. 1 illustrates a converged IP messaging service system according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail for the sake of clarity and conciseness.

Hereinafter, in the description, a new messaging service of converging messaging services, such as IM, SMS, MMS and PoC, is called a converged IP messaging service (hereinafter CPM service). The CPM service provides an interworking function between any two among the IM, the SMS, the MMS and the PoC services in order to allow message communication between a CPM client and an existing messaging service user according to the present invention, and in particular, automatically establishes a virtual session between a CPM client and an SM client in order to allow message communication between the CPM client and the SM client.

FIG. 1 illustrates a converged IP messaging service system according to the present invention. Referring to FIG. 1, the CPM service system includes a CPM client 10, a CPM server 20, an Inter-Working Function (IWF) 30, an SM server 40 and an SM client 50, and also includes an MMS server, a PoC server and an IM server, which are not shown.

The CPM client 10 supports a CPM service, and constructs a message for unidirectional message communication or interactive message communication according to selection of a user of the CPM client 10, and transmits the message to the CPM server 20. The CPM client 10 receives and processes various types of messages accompanying message communication, and provides the contents of a message to the user of the CPM client 10 if necessary or according to user settings. An example of the unidirectional message communication may be SMS or MMS, and an example of the interactive message communication may be talking on the IM service. In particular, the CPM client 10 constructs a Session Initiation Protocol (SIP) INVITE message for establishing a session in the interactive message communication and transmits the SIP INVITE message to the CPM server 20, and receives and processes a message from the CPM server 20 in response to the SIP INVITE message.

The CPM server 20 stores subscriber information of CPM clients and clients performing a conventional messaging service, and processes a message related to message communication, which is received from the sending CPM client 10. That is, if the CPM server 20 receives a message related to message communication from the sending CPM client 10, the CPM server 20 determines, by searching the pre-stored subscriber information, whether a receiving client supports the CPM service, and transmits the message to the receiving client according to a result of the determination. For example, if the receiving client is a CPM client, the CPM server 20 transmits the message to a communication network to which the receiving client is connected. If the receiving client is a client supporting only a conventional messaging service, the CPM server 20 transmits the message to the IWF 30. In particular, according to the present invention, if the CPM server 20 receives an SIP INVITE message from the CPM client 10, the CPM server 20 determines whether a target client supports the CPM service, and if it is determined that the target client does not support the CPM service, the CPM server 20 transmits the SIP INVITE message to the IWF 30. The CPM server 20 also transmits a message received from the IWF 30 to the CPM client 10.

When the IWF 30 receives a message related to message communication from the CPM server 20, the IWF 30 detects a receiving client and a message service type supported by the receiving client. If necessary, the IWF 30 transforms a format of the received message to a message format corresponding to a messaging service supported by the receiving client, and transmits the transformed message to a server of the messaging service, e.g. the SM server 40, the MMS server, the PoC server or the IM server. If necessary, the IWF 30 transforms a message received from the SM server 40, the MMS server, the PoC server or the IM server to a CPM message format and transmits the transformed message to the CPM server 20.

Thus, the IWF 30 stores messaging service subscriber information, and message formats and transformation programs corresponding to various types of messaging services.

In particular, if the IWF 30 receives the SIP INVITE message from the CPM server 20, the IWF 30 detects all types of messaging services supported by the receiving client. If the receiving client is an SM client, the IWF 30 transforms the SIP INVITE message to a format supported in the SMS, i.e. an SMS-SUBMIT message, and transmits the SMS-SUBMIT message to the SM server 40. The SMS-SUBMIT message can be constructed in two formats according to the present invention. According to a first embodiment of the present invention, information for notifying that a current SMS-SUBMIT message is an SIP INVITE message is contained in a body of the SMS-SUBMIT message, i.e. user data, without changing the existing SMS-SUBMIT message format. According to a second embodiment of the present invention, a new field, in which information for notifying that a current SMS-SUBMIT message is an SIP INVITE message and a response of a receiving SM client are stored, is added to a header of the existing SMS-SUBMIT message format.

According to the first embodiment of the present invention, if a receiving client of an SIP INVITE message received from the CPM server 20 is the SM client 50, the IWF 30 transforms the SIP INVITE message to an SMS-SUBMIT message and inserts a query sentence for asking an SM recipient for an acceptance or rejection intention on interactive message communication and a response directive for the recipient to input according to the acceptance or rejection intention into a user data field of the SMS-SUBMIT message as information for notifying that the current SMS-SUBMIT message is the SIP INVITE message. For example, the query sentence may be, "A requested B for message communication. Will you accept?" and the response directive may be "Yes" as the acceptance intention or "No" as the rejection intention. The IWF 30 activates a timer according to an effective response time immediately after transmitting the SMS-SUBMIT message in which the sentences are inserted to the SM server 40. The effective response time, i.e. a timer value, must be equal to or less than a timer value used when waiting for a response after transmitting a request in the SIP. If the IWF 30 receives an SM from the SM client 50 before the effective response time elapses, the IWF 30 determines whether the received SM is a response message related to an interactive message communication request or a general SM, according to whether the response directive is contained in user data of the received SM. The IWF 30 determines, according to a type of the response directive, whether the SM client 50 has accepted the interactive message communication request. If a response directive indicating acceptance is contained in the received SM, the IWF 30 establishes a session between the CPM client 10 and the IWF 30 by transmitting a 200 OK message to the CPM client 10. If a response directive indicating rejection is contained in the received SM, the IWF 30 stops a session establishment job by transmitting a proper one of 4xx response messages defined in the SIP to the CPM client 10. If the received SM is a general SM, the IWF 30 transforms the received SM to an SIP message and transmits the SIP message to the CPM server 20 corresponding to a receiving CPM client. In addition, the IWF 30 generates SMS-DELIVERY-REPORT messages for all received SMs and transmits the SMS-DELIVERY-REPORT messages to SM clients via the SM server 40.

If the IWF 30 cannot receive an SM from the SM server 40 in response to the interactive message communication request until the effective response time elapses, the IWF 30 generates a 4xx response according to the elapse of the effective response time, transmits the 4xx response to the CPM client 10 via the CPM server 20, generates an SM (SMS-SUBMIT message) for notifying that the effective response time has elapsed, and transmits the SM to the SM client 50 via the SM server 40. In this case, a sentence for notifying the user that the effective response time has elapsed is inserted into the SMS-SUBMIT message transmitted to the SM server 40. For example, the sentence for notifying that the effective response time has elapsed may be, "The message communication request was cancelled due to the elapse of response time." The IWF 30 considers that all SMs (SMS-DELIVER messages) received after the effective response time elapsed are separate messages regardless of the interactive message communication request, transforms each received SM to an SIP message and transmits the SIP message to the CPM server 20.

The SM server 40 is a server for supporting the SMS service, and according to the first embodiment of the present invention, transforms an SMS-SUBMIT message received from the IWF 30 into an SMS-DELIVER message and transmits the SMS-DELIVER message to the SM client 50. When the SM server 40 receives from the SM client 50 an SMS-SUBMIT message, of which a receiving client is the CPM client 10, the SM server 40 transforms the SMS-SUBMIT message into an SMS-DELIVER message and transmits the SMS-DELIVER message to the IWF 30. The SM server 40 transmits an SMS-DELIVERY-REPORT message received from the IWF 30 to the SM client 50, and if the SM server 40 receives from the SM client 50 an SMS-DELIVERY-REPORT message, of which a receiving client is the CPM client 10, the SM server 40 transmits the SMS-DELIVERY-REPORT message to the IWF 30.

The SM client 50 inserts text input by a user of the SM client 50 into an SMS-SUBMIT message and transmits the SMS-SUBMIT message to the SM server 40, and if an SMS-DELIVER message transmitted from another client is received from the SM server 40, the SM client 50 notifies that the SM has been received or displays text contained in the SM according to user settings of the SM client 50. When the SM client 50 receives an SMS-DELIVER message, the SM client 50 transmits an SMS-DELIVERY-REPORT message to the SM server 40 to notify that the SM has been received without an error.

Figure 2:
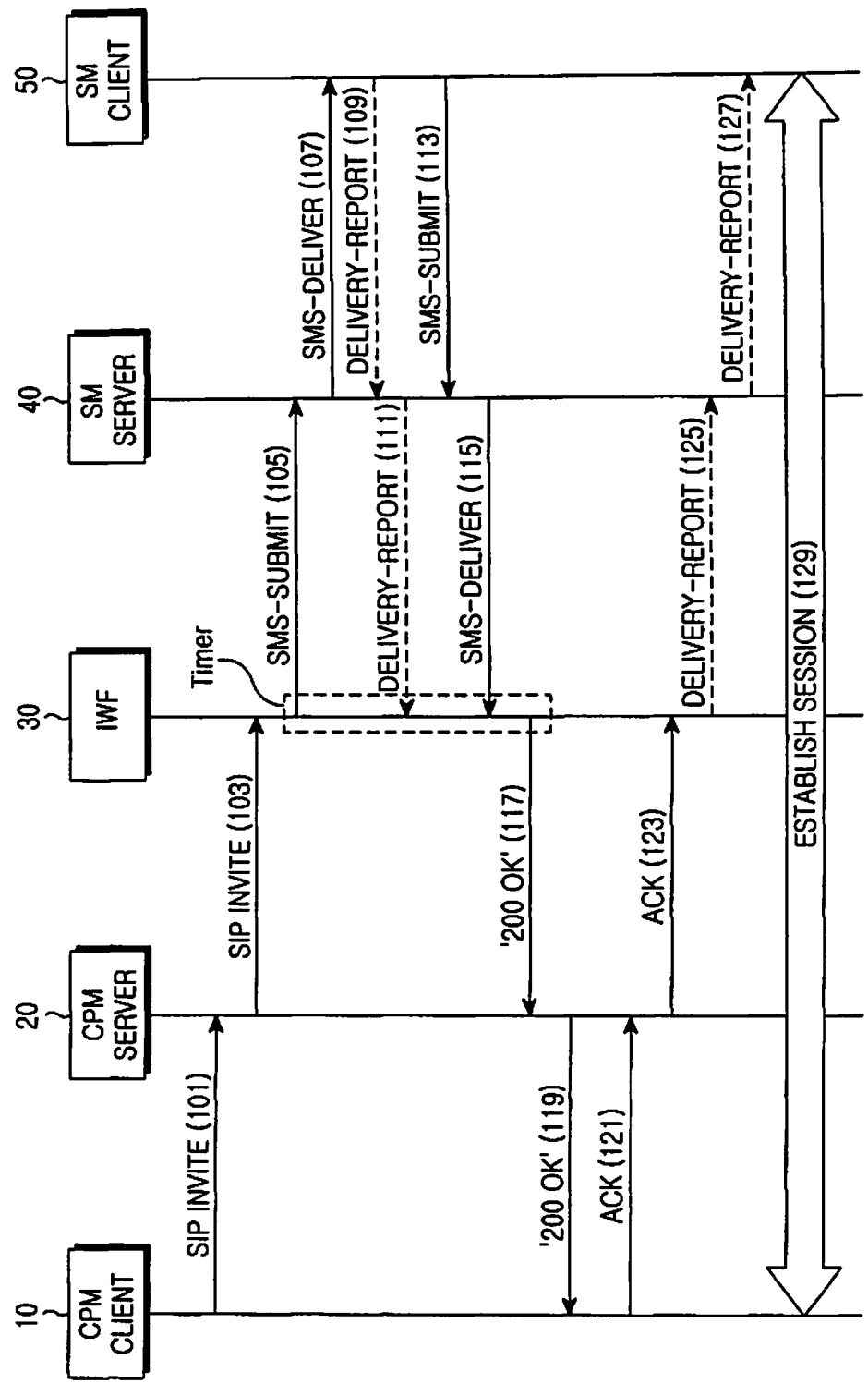
FIG. 2 illustrates a process of establishing a session for interactive message communication between a converged IP messaging client and an SM client according to a first embodiment of the present invention.

FIG. 2 illustrates a process of establishing a session for interactive message communication between the CPM client 10 and the SM client 50 according to the present invention. Referring to FIG. 2, if a request for interactive message communication with the SM client 50 is input by a user of the CPM client 10, the CPM client 10 transmits an SIP INVITE message to the CPM server 20 in step 101 to establish a session for performing the interactive message communication with the SM client 50. If it is determined through a subscriber information search that a recipient of the SIP INVITE message does not use a CPM service, the CPM server 20 transmits the SIP INVITE message to the IWF 30 in step 103. The IWF 30 detects a type of a messaging service used by the recipient by searching subscriber information corresponding to a receiving client of the SIP INVITE message. If the IWF 30 detects that the recipient uses the SMS but does not use another messaging service, such as MMS, IM or PoC service, the IWF 30 transforms the SIP INVITE message into an SMS-SUBMIT message. During the transformation, the IWF 30 inserts an interactive message communication request sentence and a response directive into a user data field of the SMS-SUBMIT message. The IWF 30 transmits the SMS-SUBMIT message to the SM server 40, which provides the SMS to the receiving SM client 50, in step 105 and activates a timer immediately after the transmission. The SM server 40 transforms the SMS-SUBMIT message into an SMS-DELIVER message and transmits the SMS-DELIVER message to the SM client 50 in step 107. The SM client 50 may notify a user of the SM client 50 that the SMS-DELIVER message has been received and display the interactive message communication request sentence and the response directive on a display screen according to SM client 50 user settings. The SM client 50 transmits an SMS-DELIVERY-REPORT message to the SM server 40 in step 109. The SM server 40 transmits the SMS-DELIVERY-REPORT message to the IWF 30 in step 111.

The user of the SM client 50 confirms the displayed interactive message communication request sentence, inputs an acceptance response directive, e.g. "Yes", to accept the requested interactive message communication, and requests SM transmission. The SM client 50 constructs an SMS-SUBMIT message in response to the user request and transmits the SMS-SUBMIT message to the SM server 40 in step 113. The SM server 40 transforms the SMS-SUBMIT message received from the SM client 50 into an SMS-DELIVER message and transmits the SMS-DELIVERY message to the IWF 30 in step 115. Since the IWF 30 receives the SMS-DELIVERY message from the SM server 40 before the effective response time elapses and the SMS-DELIVERY message contains the response directive indicating "Yes", i.e. the acceptance on the interactive message communication request, the IWF 30 considers the SMS-DELIVERY message as an acceptance message responding to the SIP INVITE message. Thus, the IWF 30 transmits a 200 OK message to the CPM server 20 in step 117. The CPM server 20 transmits the 200 OK message received from the IWF 30 to the CPM client 10 in step 119. The CPM client 10 transmits an ACK message to the CPM server 20 in response to the 200 OK message in step 121. The CPM server 20 transmits the ACK message received from the CPM client 10 to the IWF 30 in step 123. When the IWF 30 receives the ACK message from the CPM server 20, the IWF 30 generates an SMS-DELIVERY-REPORT message in response to the SMS-DELIVERY message, which was received in step 115, and transmits the SMS-DELIVERY-REPORT message to the SM server 40 in step 125. The SM server 40 transmits the SMS-DELIVERY-REPORT message to the SM client 50 in step 127, and accordingly, a session between the CPM client 10 and the SM client 50 is established in step 129. As described above, the SM client 50 can accept the interactive message communication request of the CPM client 10, and since the SIP INVITE message and the 200 OK message were transmitted and received between the CPM client 10 and the IWF 30, a virtual session is established between the CPM client 10 and the SM client 50.

Meanwhile, the user of the SM client 50 can reject the interactive message communication request of the CPM client 10, and in this case, a process of the CPM service system will now be described with reference to FIG. 3.

Figure 3:
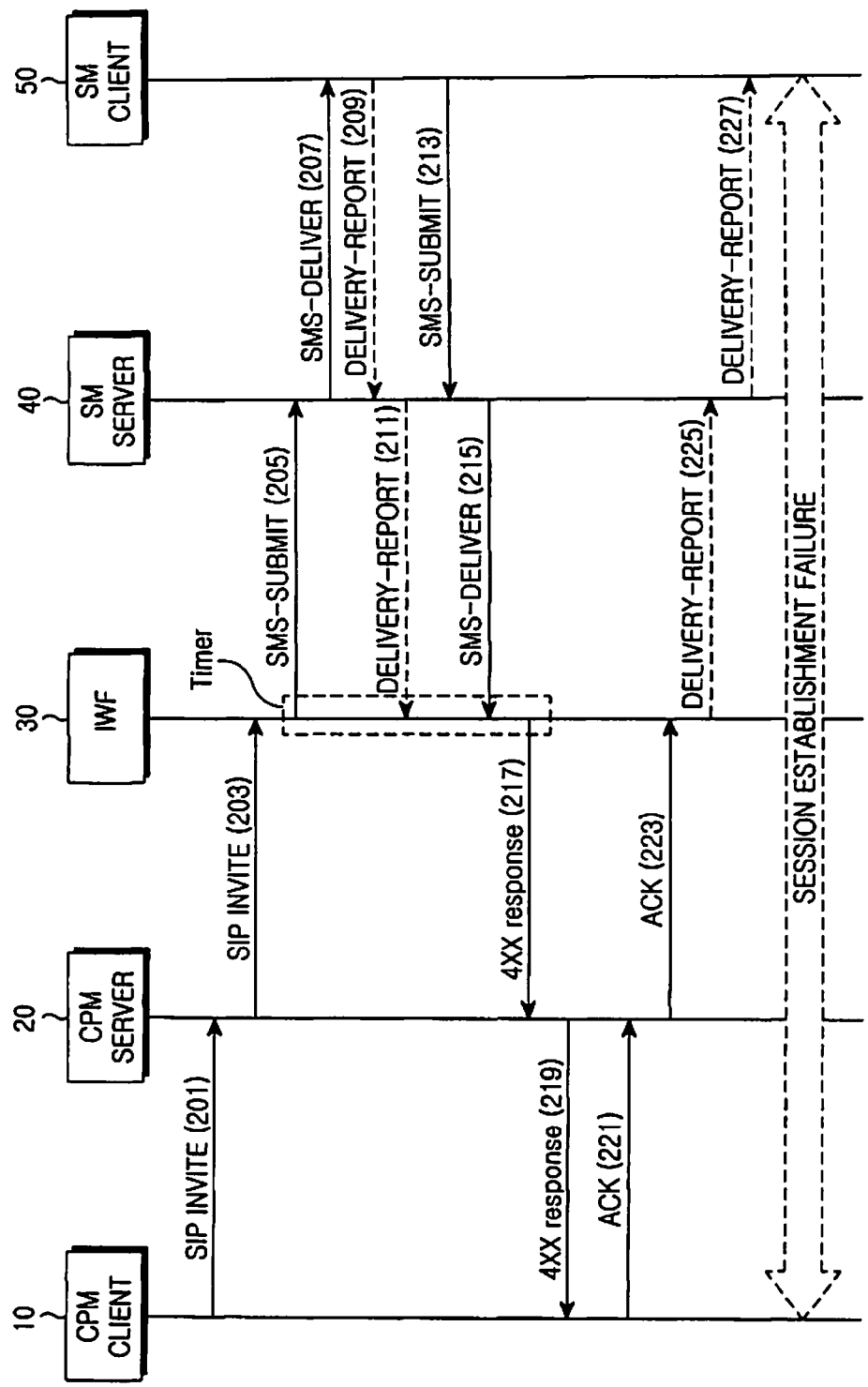
FIG. 3 describes session establishment failure in a process of establishing a session for interactive message communication between a converged IP messaging client and an SM client according to the first embodiment of the present invention.

FIG. 3 describes session establishment failure in a process of establishing a session for interactive message communication between the CPM client 10 and the SM client 50 according to the present invention. Steps 201 to 211 illustrated in FIG. 3 are the same as steps 101 to 111 illustrated in FIG. 2. Referring to FIG. 3, in steps 201 to 207, the SM client 50 receives an SM containing an interactive message communication request of the user of the CPM client 10 and displays an interactive message communication request sentence and a response directive. The user of the SM client 50 confirms the SM, inputs a rejection response directive, e.g. "No", in order to reject the requested interactive message communication, and requests SM transmission. In response to the user request, the SM client 50 transmits an SM (SMS-SUBMIT message) containing the rejection response directive "No" to the SM server 40 in step 213. The SM server 40 transforms the SMS-SUBMIT message received from the SM client 50 into an SMS-DELIVERY message and transmits the SMS-DELIVERY message to the IWF 30 in step 215. Since the IWF 30 receives the SMS-DELIVERY message from the SM server 40 before the effective response time elapses and the SMS-DELIVERY message contains the rejection response directive, i.e. "No", the IWF 30 considers the SMS-DELIVERY message as a rejection message responding to the SIP INVITE message. Thus, the IWF 30 transmits a 4xx response indicating rejection of an SMS user to the CPM server 20 in step 217. The CPM server 20 transmits the 4xx response to the CPM client 10 in step 219. The CPM client 10 transmits an ACK message to the CPM server 20 in response to the 4xx response in step 221. The CPM server 20 transmits the ACK message received from the CPM client 10 to the IWF 30 in step 223. When the IWF 30 receives the ACK message from the CPM server 20, the IWF 30 generates an SMS-DELIVERY-REPORT message in response to the SMS-DELIVER message, which was received in step 215, and transmits the SMS-DELIVERY-REPORT message to the SM server 40 in step 225. The SM server 40 transmits the SMS-DELIVERY-REPORT message to the SM client 50 in step 227. As described above, since the SM client 50 rejected the interactive message communication request of the CPM client 10 and the CPM client 10 could not receive a 200 OK message responding to the SIP INVITE message, session establishment between the CPM client 10 and the SM client 50 fails.

This session establishment failure may occur when the IWF 30 cannot receive an SM containing a response directive responding to an interactive message communication request before the effective response time elapses besides the case where the SM client 50 rejects the interactive message communication request. In this case, a process of the CPM service system will now be described with reference to FIG. 4.

Figure 4:
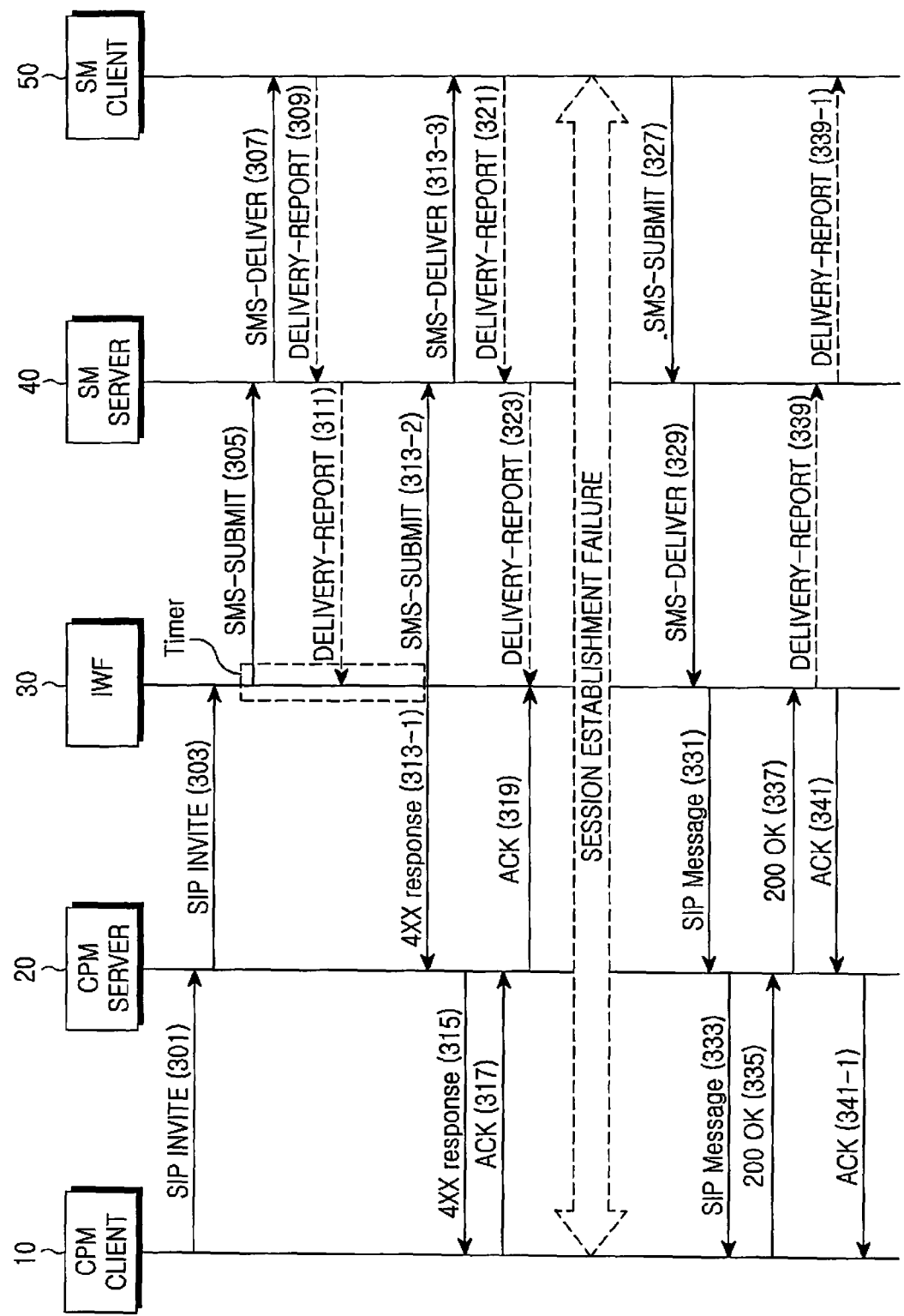
FIG. 4 describes session establishment failure due to the elapse of an effective response time in a process of establishing a session for interactive message communication between a converged IP messaging client and an SM client according to the first embodiment of the present invention.

FIG. 4 describes session establishment failure due to the elapse of the effective response time in a process of establishing a session for interactive message communication between the CPM client 10 and the SM client 50 according to the present invention. Steps 301 to 311 illustrated in FIG. 4 are to the same as steps 101 to 111 illustrated in FIG. 2.

Referring to FIG. 4, in steps 301 to 311, in response to an interactive message communication request of the user of the CPM client 10, the IWF 30 transforms an SIP INVITE message received from the CPM client 10 into an SMS-SUBMIT message, transmits the SMS-SUBMIT message to the SM client 50 via the SM server 40, and receives an SMS-DELIVERY-REPORT message in response. Thereafter, if the IWF 30 cannot receive an SM containing a response directive from the SM server 40 until the effective response time set in step 305 elapses, immediately after the effective response time elapses, the IWF 30 transmits a 4xx response to the CPM client 10, generates an SM (SMS-SUBMIT message) for notifying that the effective response time for the interactive message communication request has elapsed, and transmits the SM to the SM client 50 in step 313. In other words, immediately after the effective response time elapses, the IWF 30 transmits the 4xx response to the CPM server 20 in step 313-1, generates an SMS-SUBMIT message containing a sentence indicating that the effective response time has elapsed and transmits the SMS-SUBMIT message to the SM server 40 in step 313-2. The CPM server 20 transmits the 4xx response received from the IWF 30 to the CPM client 10 in step 315. The SM server 40 transforms the SMS-SUBMIT message, which was received from the IWF 30 in step 313-2, into an SMS-DELIVER message, and transmits the SMS-DELIVER message to the SM client 50 in step 313-3. The CPM client 10 transmits an ACK message to the CPM server 20 in step 317 in response to the 4xx response received from the CPM server 20, and the CPM server 20 transmits the ACK message to the IWF 30 in step 319. The SM client 50 transmits an SMS-DELIVERY-REPORT message to the SM server 40 in step 321 in response to the SMS-DELIVER message received from the SM server 40, and the SM server 40 transmits the SMS-DELIVERY-REPORT message to the IWF 30 in step 323. Accordingly, the session establishment between the CPM client 10 and the SM client 50 fails. Thus, even if the IWF 30 receives an SM containing a response directive, i.e. an SMS-DELIVER message, after the effective response time elapses, a session is not established.

When the IWF 30 receives an SM containing a response directive after the effective response time elapses, the IWF 30 processes the received SM as a general SM. In other words, after the effective response time elapses, the IWF 30 determines and processes every received SM as a message separately transmitted from the SM client 50 to the CPM client 10 regardless of the interactive message communication without determining whether each received SM contains a response directive. Thus, the IWF 30 transforms an SMS-DELIVER message into an SIP message and transmits the SIP message to the CPM server 20, which is illustrated in steps 327 to 339-1.

After the session establishment failure between the CPM client 10 and the SM client 50 due to the elapse of the effective response time, if the user of the SM client 50 requests transmission of an SM containing the acceptance response directive "Yes", the SM client 50 constructs an SM (SMS-SUBMIT message) containing the acceptance response directive and transmits the SMS-SUBMIT message to the SM server 40 in step 327. The SM server 40 transforms the received SMS-SUBMIT message into an SMS-DELIVER message and transmits the SMS-DELIVER message to the IWF 30 in step 329. Since the effective response time has elapsed even if the IWF 30 receives the SM (SMS-DELIVER message) containing the acceptance response directive, the IWF 30 transforms the SMS-DELIVER message into an SIP message without separately analyzing the SM and transmits the SIP message to the CPM server 20 in step 331. The CPM server 20 transmits the SIP message received from the IWF 30 to the CPM client 10 in step 333. The CPM client 10 transmits a 200 OK message to the CPM server 20 in step 335 in response to the SIP message received from the CPM server 20. The CPM server 20 transmits the 200 OK message received from the CPM client 10 to the IWF 30 in step 337. The IWF 30 transforms the 200 OK message to an SMS-DELIVERY-REPORT message and transmits the SMS-DELIVERY-REPORT message to the SM client 50 via the SM server 40 in steps 339 and 339-1. In addition, the IWF 30 transmits an ACK message to the CPM client 10 via the CPM server 20 in steps 341 and 341-1 in response to the 200 OK message.

Figure 5:
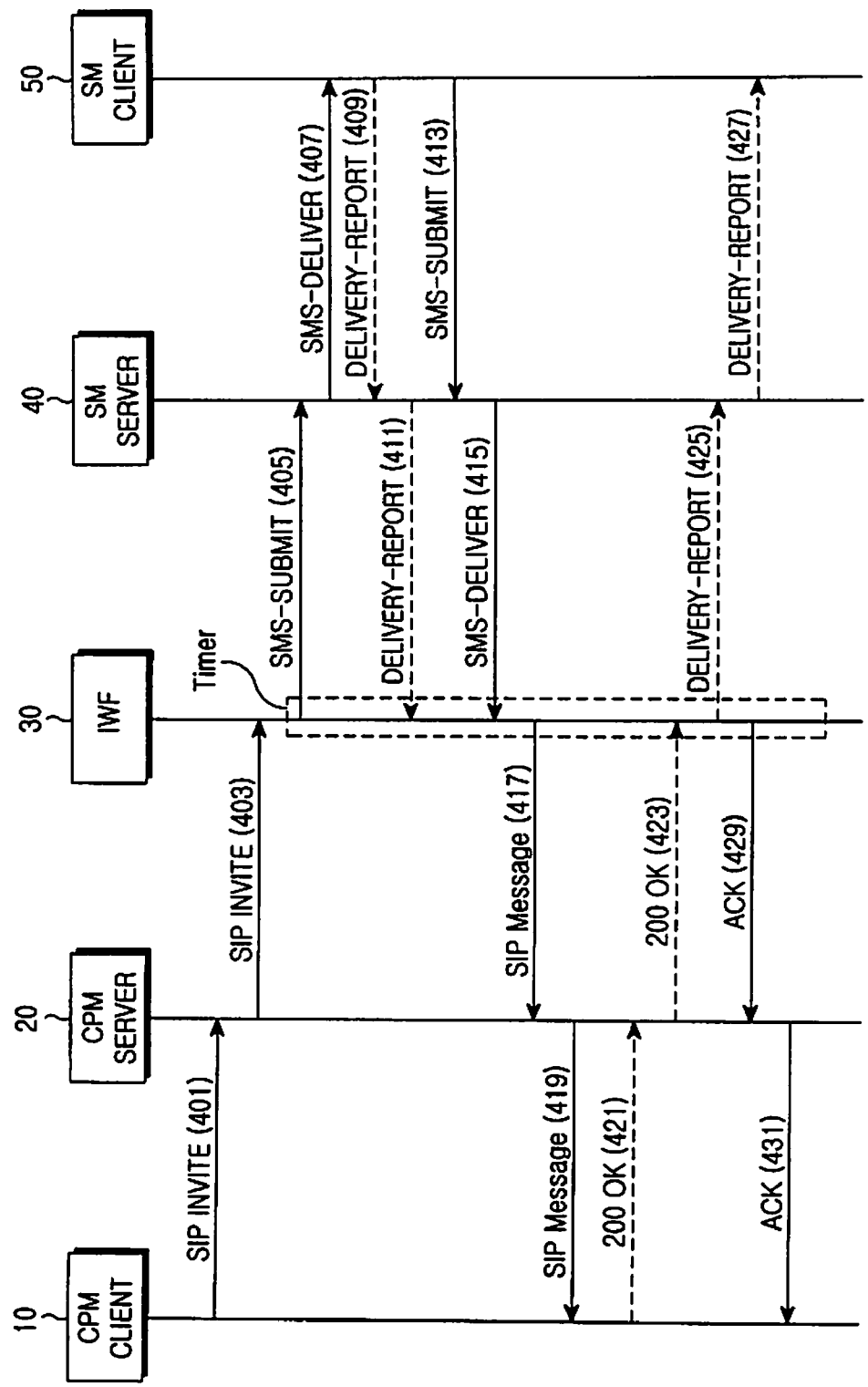
FIG. 5 illustrates a process of processing a general short message when a session is established for interactive message communication between a converged IP messaging client and an SM client according to the first embodiment of the present invention.

FIG. 5 illustrates a process of processing a general SM in interactive message communication between the CPM client 10 and the SM client 50 according to the present invention. Steps 401 to 411 illustrated in FIG. 5 are to the same as steps 101 to 111 illustrated in FIG. 2.

Referring to FIG. 5, in steps 401 to 411, in response to an interactive message communication request of the user of the CPM client 10, the IWF 30 transforms an SIP INVITE message received from the CPM client 10 into an SMS-SUBMIT message, transmits the SMS-SUBMIT message to the SM client 50 via the SM server 40, and receives an SMS-DELIVERY-REPORT message in response. Thereafter, the SM client 50 generates a separate SM (SMS-SUBMIT message) regardless of the SM containing an interactive message communication request sentence, which was received in step 407 and transmits the SMS-SUBMIT message to the SM server 40 in step 413. Here, the separate SMS-SUBMIT message does not contain a response directive "Yes" or "No". The SM server 40 transforms the SMS-SUBMIT message received from the SM client 50 into an SMS-DELIVER message and transmits the SMS-DELIVER message to the IWF 30 in step 415. Since the IWF 30 receives the SM (SMS-DELIVER message) before the effective response time elapses, the IWF 30 determines whether the received SM contains a response directive. If it is determined that the received SM contains a response directive, the process illustrated in FIG. 2 or 3 is performed. If it is determined that the received SM does not contain a response directive, the IWF 30 determines the received SM as a separate message regardless of an SIP-INVITE message received in step 403 or an SMS-SUBMIT message transmitted in step 405. Thus, the IWF 30 transforms the received SMS-DELIVER message to an SIP message and transmits the SIP message to the CPM server 20 in step 417. The CPM server 20 transmits the SIP message received from the IWF 30 to the CPM client 10 in step 419. The CPM client 10 transmits a 200 OK message to the CPM server 20 in step 421 to notify the IWF 30 that the CPM client 10 has received the SIP message. The CPM server 20 transmits the 200 OK message received from the CPM client 10 to the IWF 30 in step 423. If the 200 OK message is received from the CPM server 20, the IWF 30 generates an SMS-DELIVERY-REPORT message in response to the SMS-DELIVER message, which was received in step 415, and transmits the SMS-DELIVERY-REPORT message to the SM client 50 via the SM server 40 in steps 425 and 427. In addition, in response to the 200 OK message, the IWF 30 transmits an ACK message to the CPM client 10 via the CPM server 20 in steps 429 and 431.

A process hereinafter may proceed the same as the process illustrated in FIGS. 2, 3, or 4 by depending on an operation of the user of the SM client 50.

As described above, when the IWF 30 receives an SIP INVITE message, of which a receiving client is the SM client 50, from the CPM client 10 via the CPM server 20, the IWF 30 transforms the SIP INVITE message into a message having a format supported by the SMS, i.e. an SMS-SUBMIT message, and transmits the SMS-SUBMIT message to the SM client 50 via the SM server 40. If the IWF 30 receives an SM from the SM client 50 in response to the SMS-SUBMIT message within the effective response time, a session between the CPM client 10 and the SM client 50 is established. According to the first embodiment of the present invention, without changing the existing format of the SMS-SUBMIT message, the SMS-SUBMIT message contains only information for notifying that a current SMS-SUBMIT message is an SIP INVITE message in a user data field of the SMS-SUBMIT message.

Operations of the CPM service system according to the first embodiment of the present invention have been described with reference to FIGS. 2 to 5. The second embodiment of the present invention will be described with reference to FIG. 6, wherein when the IWF 30 transforms an SIP INVITE message to an SMS-SUBMIT message, the IWF 30 inserts a query sentence for asking an SM recipient for an acceptance or rejection intention on interactive message communication into the user data field of the SMS-SUBMIT message as in the first embodiment, and adds a header field to a conventional SMS-SUBMIT message to notify an SM client that a current SMS-SUBMIT message is an SIP INVITE message, and when the receiving SM client transmits a response to the SMS-SUBMIT message containing the header field, the receiving SM client adds a header field to a current SMS-SUBMIT message to notify that the current SMS-SUBMIT message is an acceptance or rejection response message in response to an interactive message communication request.

According to the second embodiment of the present invention, when an SIP INVITE message is transformed to an SMS message format, since a sentence for the user of the SM client 50 and a header field for the SM client 50 are added to an SMS-SUBMIT message, instead of directly inputting a response directive as in the first embodiment of the present invention when the user of the SM client 50 inputs a response on whether the user of the SM client 50 accepts or rejects an interactive message communication request, by inputting a specific key, a response on whether the user of the SM client 50 accepts or rejects an interactive message communication request can be achieved.

When the IWF 30 transforms an SIP INVITE message to an SMS-SUBMIT message, a header field newly added to a header of the SMS-SUBMIT message according to the second embodiment of the present invention is illustrated in Table 1.

TABLE 1

| Header field | Size | Function |
| --- | --- | --- |
| TP_INVITE | 1 Bit | Add in transmission from the IWF 30 to the SM client 50.<br>When its value is 1,<br>1. Notify the SM client 50 that SIP INVITE is a transformed message.<br>2. Indicate that an acceptance or rejection message must be generated and transmitted if a key input pre-defined by a user is received in a state where a message is displayed on a display device of a receiving client. Here, information on the key corresponding to the acceptance or rejection is inserted into a user data field of SMS-SUBMIT.<br>When its value is 0,<br>1. indicate that it is processed the same as a general SM. |

A header field newly added to a response message (SMS-SUBMIT) generated by the SM client 50 when the user of the SM client 50 inputs a specific key according to the second embodiment of the present invention is illustrated in Table 2.

TABLE 2

| Header field | Size | Function |
| --- | --- | --- |
| TP_RESPONSE | 1 Bit | Add in transmission from the SM client 50 to the IWF 30.<br>When its value is 1,<br>1. accept interactive message communication.<br>When its value is 0,<br>1. reject interactive message communication. |

According to the second embodiment of the present invention, if the IWF 30 receives an SIP INVITE message, of which a receiving client is only the SM client 50 since a recipient uses only the SMS, from the CPM server 20, the IWF 30 inserts a sentence for asking the SMS user for interactive message communication into a body, i.e. a user data field, of an SMS-SUBMIT message. The IWF 30 also adds a TP_INVITE header field to a header portion of the SMS-SUBMIT message and sets its field value to 1. The process of transmitting the transformed SMS-SUBMIT message to the SM client 50 via the SM server 40 is the same as the process described in the first embodiment of the present invention.

The SM client 50, which has received the SMS-SUBMIT message to which the TP_INVITE header field is added, provides the sentence indicating an interactive message communication request to the user of the SM client 50 and simultaneously displays a sentence for guiding a specific key for selectively inputting acceptance or rejection in response to the interactive message communication request. The user of the SM client 50 inputs the key for accepting or rejecting the interactive message communication request by referring to the displayed sentences. If the key for accepting or rejecting the interactive message communication request is input by the user of the SM client 50, the SM client 50 adds a TP_RESPONSE header field to a header portion of an SMS-SUBMIT message, sets a value of the TP_RESPONSE header field to 0 or 1 according to the rejection or acceptance selected by the user of the SM client 50, and transmits the SMS-SUBMIT message to the SM server 40. If the IWF 30 receives an SM (SMS-DELIVER) from the SM server 40 before the effective response time elapses, the IWF 30 determines whether the SMS-DELIVER message contains the TP_RESPONSE header field. If it is determined that the TP_RESPONSE header field is not contained, the IWF 30 determines the received SMS-DELIVER message to be a separate SM regardless of SIP-INVITE, and waits for a response to the SIP-INVITE message until the effective response time elapses. The IWF 30 transforms the received SM to an SIP message and transmits the SIP message to the CPM client 10 via the CPM server 20. If it is determined that the TP_RESPONSE header field is contained in the SMS-DELIVER message, the IWF 30 detects a value of the TP_RESPONSE header field and determines that the SM client 50 has accepted or rejected the interactive message communication when the value is 1 or 0. The IWF 30 inserts a sentence indicating acceptance or rejection of SIP-INVITE into an SIP message and transmits the SIP message to the CPM client 10.

According to the second embodiment of the present invention, if the IWF 30 receives an SM containing TP_RESPONSE after the effective response time elapses, the IWF 30 discards the SM without transmitting the SM to the CPM client 10 regardless of the acceptance or rejection of the interactive message communication. Unlike the first embodiment of the present invention, the IWF 30 can determine by checking only a header field of the received SM, i.e. determining whether a TP_RESPONSE header field is contained in the received SM, whether the received SM is a response to the interactive message communication request, or a general SM. The IWF 30 transmits an SMS-DELIVERY-REPORT message to the SM client 50 in response to the received SM, wherein a sentence for notifying that the effective response time has elapsed is inserted into the SMS-DELIVERY-REPORT message. The above-described process is illustrated in FIG. 6.

Figure 6:
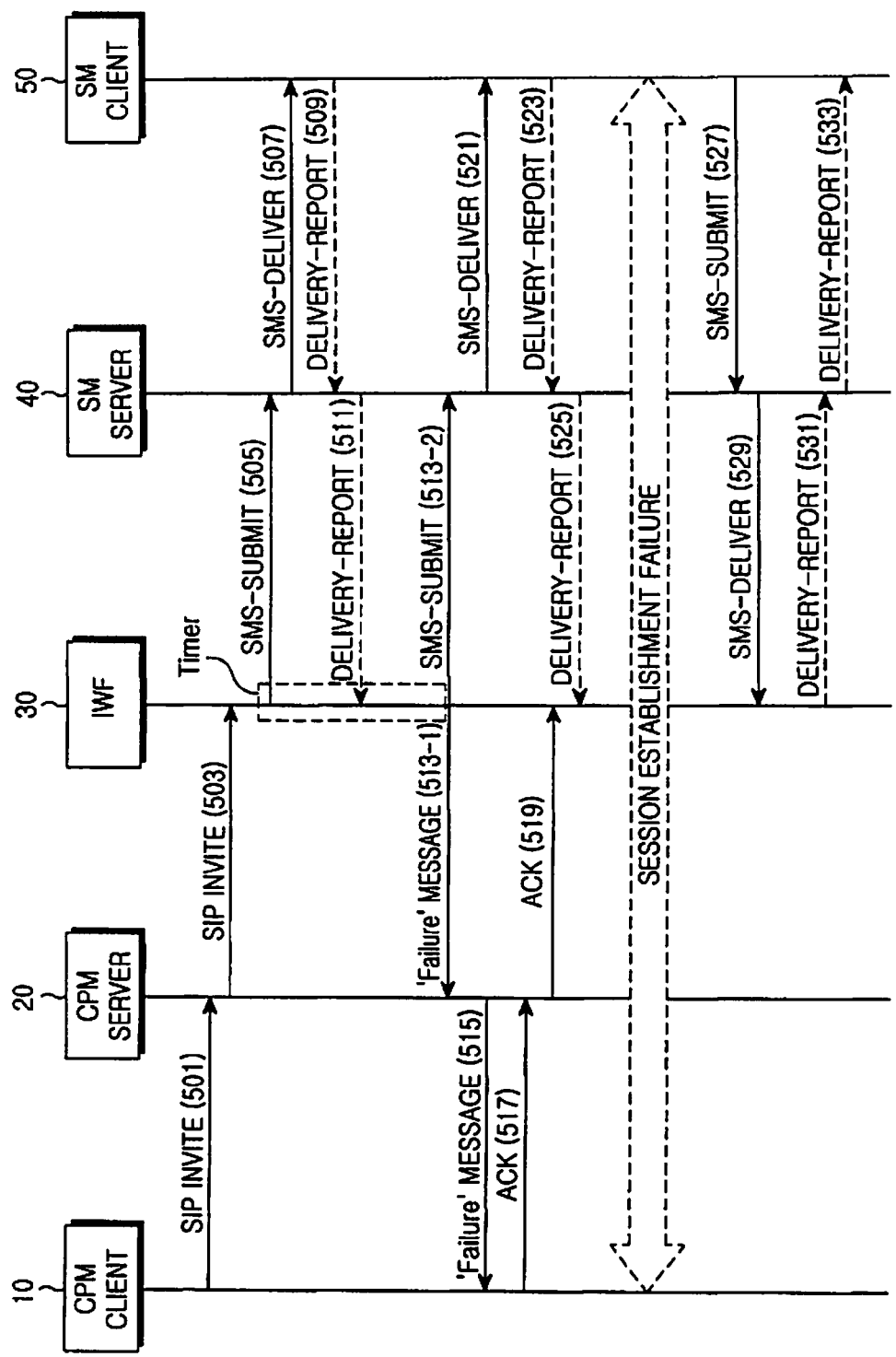
FIG. 6 describes session establishment failure due to the elapse of an effective response time in a process of establishing a session for interactive message communication between a converged IP messaging client and an SM client according to a second embodiment of the present invention.

FIG. 6 describes session establishment failure due to the elapse of the effective response time in a process of establishing a session for interactive message communication between the CPM client 10 and the SM client 50 according to the second embodiment of the present invention. Referring to FIG. 6, if a request for interactive message communication with the SM client 50 is input by the user of the CPM client 10, the CPM client 10 transmits an SIP INVITE message to the CPM server 20 in step 501 to establish a session for performing the interactive message communication with the SM client 50. If it is determined through a subscriber information search that a recipient of the SIP INVITE message does not use a CPM service, the CPM server 20 transmits the SIP INVITE message to the IWF 30 in step 503. The IWF 30 detects the type of a messaging service used by the recipient by searching subscriber information corresponding to a receiving client of the SIP INVITE message. If the IWF 30 detects that the recipient uses SMS and does not use another messaging service, such as MMS, IM or PoC service, the IWF 30 transforms the SIP INVITE message into an SMS-SUBMIT message. During the transformation, the IWF 30 adds a TP_INVITE header field to a header portion of the SMS-SUBMIT message, sets a value of the TP_INVITE header field to 1, and inserts an interactive message communication request sentence into a user data field of the SMS-SUBMIT message. The IWF 30 transmits the SMS-SUBMIT message to the SM server 40, which provides the SMS to the receiving SM client 50, in step 505, and activates a timer immediately after the transmission. The SM server 40 transforms the SMS-SUBMIT message into an SMS-DELIVER message and transmits the SMS-DELIVER message to the SM client 50 in step 507. The SM client 50 may notify the user of the SM client 50 that the SMS-DELIVER message has been received, and display the interactive message communication request sentence and a response directive on a display screen according to settings of the user of the SM client 50. The SM client 50 transmits an SMS-DELIVERY-REPORT message to the SM server 40 in step 509. The SM server 40 transmits the SMS-DELIVERY-REPORT message to the IWF 30 in step 511. Thereafter, if the IWF 30 cannot receive an SM containing a response directive from the SM server 40 until the effective response time set in step 505 elapses, immediately after the effective response time elapses, the IWF 30 transmits a 4xx response to the CPM client 10, generates an SM (SMS-SUBMIT message) for notifying that the effective response time for the interactive message communication request has elapsed, and transmits the SM to the SM client 50 in step 513. In other words, immediately after the effective response time elapses, the IWF 30 transmits the 4xx response to the CPM server 20 in step 513-1, and generates an SMS-SUBMIT message containing a sentence indicating that the effective response time has elapsed and transmits the SMS-SUBMIT message to the SM server 40 in step 513-2. The CPM server 20 transmits the 4xx response received from the IWF 30 to the CPM client 10 in step 515. The SM server 40 transforms the SMS-SUBMIT message, which was received from the IWF 30, into an SMS-DELIVER message and transmits the SMS-DELIVER message to the SM client 50 in step 521. The CPM client 10 transmits an ACK message to the CPM server 20 in step 517 in response to the 4xx response received from the CPM server 20, and the CPM server 20 transmits the ACK message to the IWF 30 in step 519. The SM client 50 transmits an SMS-DELIVERY-REPORT message to the SM server 40 in step 523 in response to the SMS-DELIVER message received from the SM server 40, and the SM server 40 transmits the SMS-DELIVERY-REPORT message to the IWF 30 in step 525. Accordingly, the session establishment between the CPM client 10 and the SM client 50 fails. Thus, even if the IWF 30 receives an SM containing a response directive, i.e. an SMS-DELIVER message, after the effective response time elapses, a session is not established.

When the IWF 30 receives an SM containing a TP_RESPONSE header field after the effective response time elapses, the IWF 30 discards the received SM. After the session establishment failure between the CPM client 10 and the SM client 50 due to the elapse of the effective response time, the SM client 50 constructs an SM (SMS-SUBMIT message), in which a TP_RESPONSE header field is added and a field value corresponding to acceptance is set according to an input of the user of the SM client 50, and transmits the SMS-SUBMIT message to the SM server 40 in step 527. The SM server 40 transforms the received SMS-SUBMIT message to an SMS-DELIVER message and transmits the SMS-DELIVER message to the IWF 30 in step 529. Although the IWF 30 receives the SM (SMS-DELIVER message) containing the TP_RESPONSE header field, since the effective response time has elapsed, the IWF 30 discards the received SM, generates an SMS-DELIVERY-REPORT message containing a sentence for notifying of transmission failure due to the elapse of the effective response time, and transmits the SMS-DELIVERY-REPORT message to the SM server 40 in step 531. The SM server 40 transmits the SMS-DELIVERY-REPORT message to the SM client 50 in step 533.

As described above, if the IWF 30 receives an SIP INVITE message, of which a receiving client is the SM client 50, from the CPM client 10 via the CPM server 20 according to the second embodiment of the present invention, the IWF 30 transforms the SIP INVITE message into a message of a format supported by the SMS, i.e. an SMS-SUBMIT message, adds a new header field, in which information for notifying that a current SMS-SUBMIT message is an SIP INVITE message is stored, to the SMS-SUBMIT message, and transmits the SMS-SUBMIT message to the SM client 50 via the SM server 40, and if the IWF 30 receives an SM, to which a new header field in which an acceptance response in response to the SMS-SUBMIT message is stored is added, from the SM client 50 within the effective response time, a session between the CPM client 10 and the SM client 50 can be established.

As described above, according to the present invention, a converged IP messaging client transmits a session establishment request for interactive message communication, and when a converged IP messaging server receives the session establishment request, the converged IP messaging server determines whether a target client of the interactive message communication uses a converged IP messaging service. If it is determined the target client does not use the converged IP messaging service, the converged IP messaging server transmits the session establishment request to an IWF, and after the IWF receives the session establishment request, if it is determined that the target client is an SM client, the IWF generates an interactive message communication request by transforming a format of the session establishment request to an SMS format and transmits the interactive message communication request to the SM client. If the IWF receives an acceptance response from the SM client in response to the interactive message communication request within an effective response time, a session for the interactive message communication can be established between the converged IP messaging client and the SM client.

While the invention has been shown and described with reference to a certain preferred embodiment thereof, it will be understood by those skilled in the art that various changes in form and details may be made therein without departing from the spirit and scope of the invention as defined by the appended claims.

What is claimed is:
1. A method of establishing a session for interactive message communication between a converged Internet Protocol (IP) messaging client and a non converged IP messaging client in a converged IP messaging service system, the method in the converged IP messaging system comprising:
   receiving a session establishment request message for the interactive message communication from a converged IP messaging client;

determining whether a target client of an interactive message supports a converged IP messaging service on the basis of the session establishment request message; and if it is determined that the target client is a non converged IP messaging client supporting a non converged IP messaging service, requesting, to an Inter-Working Function (IWF), changing the session establishment request message to an interactive message communication request message which can be received by the non converged IP messaging client, wherein the IWF transmits the interactive message communication request message including an acceptance request to the interactive message communication, to the non converged IP messaging client, when the IWF receives the request for changing the session establishment request message, the IWF receives the session establishment request by receiving a Session Initiation Protocol (SIP) INVITE message, which was transmitted from the converged IP messaging client, from a converged IP messaging server, the IWF determines by searching subscriber information of the target client of the interactive message communication that the target client of the interactive message communication is the non converged IP messaging client, the IWF generates a Short Messaging Service (SMS)-SUBMIT message in which a sentence indicating the interactive message communication request and one of a response directive and key information, which must be input by a user of the non converged IP messaging client in response to the interactive message communication request, are contained in response to the SIP INVITE message, and the IWF transmits the SMS-SUBMIT message to the non converged IP messaging client via a non converged IP messaging server.

2. The method of claim 1, further comprising if the IWF receives an acceptance response from the non converged IP messaging client in response to the interactive message communication request message within a response time, the IWF establishes a session for the interactive message communication between the converged IP messaging client and the non converged IP messaging client; and if the IWF receives a rejection response from the non converged IP messaging client in response to the interactive message communication request within the response time, the IWF notifies the converged IP messaging client and the non converged IP messaging client of session establishment failure.

3. The method of claim 2, further comprising if the IWF does not receive the acceptance or rejection response from the non converged IP messaging client in response to the interactive message communication request within the response time, the IWF notifies the converged IP messaging client and the non converged IP messaging client of session establishment failure when the response time elapses.

4. The method of claim 3, further comprising if the IWF receives the acceptance or rejection response from the non converged IP messaging client in response to the interactive message communication request after the response time elapses, the IWF transmits the acceptance or rejection response to the converged IP messaging client by processing the acceptance or rejection response as a short message.

5. The method of claim 3, further comprising if the IWF receives the acceptance or rejection response from the non converged IP messaging client in response to the interactive message communication request after the response time elapses, the IWF discards the acceptance or rejection response.

6. The method of claim 1, wherein the IWF establishing the session for the interactive message communication between the converged IP messaging client and the non converged IP messaging client further:

receives a non converged IP message from the non converged IP messaging client within the response time;

determines whether the message includes a response directive;

determines, if it is determined that the message includes the response directive, whether the response directive is an acceptance response directive or a rejection response directive;

establishes, if it is determined that the response directive is an acceptance response directive, the session for the interactive message communication between the converged IP messaging client and the non converged IP messaging client by transmitting a 200 OK message to the converged IP messaging client and transmitting an SMS-DELIVERY-REPORT message to the non converged IP messaging client; and if it is determined that the response directive included in the message is a rejection response directive, notifies of session establishment failure by transmitting a 4xx response to the converged IP messaging client and transmitting an SMS-DELIVERY-REPORT message to the non converged IP messaging client, wherein the sentence indicating the interactive message communication request and the response directive are stored in user data.

7. The method of claim 1, wherein the interactive message communication request message includes a response request message for indicating acceptance or rejection for the interactive message communication.

8. The method of claim 5, wherein the IWF transmitting the interactive message communication request to the non converged IP messaging client further:

receives the session establishment request by receiving a SIP INVITE message, which was transmitted from the converged IP messaging client, from a converged IP messaging server;

determines by searching subscriber information of the target client of the interactive message communication that the target client of the interactive message communication is the non converged IP messaging client; and generates an SMS-SUBMIT message to which a header field indicating an interactive message communication request message is added in response to the SIP INVITE message, and transmitting the SMS-SUBMIT message to the non converged IP messaging client via a non converged IP messaging server;

wherein the SMS-SUBMIT message further comprises a sentence indicating the interactive message communication request and key information, which must be input by a user of the non converged IP messaging client as an acceptance or rejection in response to the interactive message communication request.

9. A converged IP messaging server in a converged Internet Protocol (IP) messaging service system, the server comprising:

a message transceiver; and a processor for receiving a session establishment request message for interactive message communication through the message transceiver from a converged IP messaging client, determining whether a target client of an interactive message supports a converged IP messaging service on the basis of the session establishment request message, and if it is determined that the target client is a non converged IP messaging client supporting a non converged IP messaging service, requesting, to an Inter-Working Function (IWF), changing the session establishment request message to an interactive message communication request message which can be received by the non converged IP messaging client, wherein the IWF transmits the interactive message communication request message including an acceptance request to the interactive message communication to the non converged IP messaging client, when the IWF receives the request for changing the session establishment request message, the IWF receives the session establishment request by receiving a Session Initiation Protocol (SIP) INVITE message, which was transmitted from the converged IP messaging client, from the converged IP messaging server, the IWF determines by searching subscriber information of the target client of the interactive message communication that the target client of the interactive message communication is the non converged IP messaging client, the IWF generates a Short Messaging Service (SMS)-SUBMIT message in which a sentence indicating the interactive message communication request and one of a response directive and key information, which must be input by a user of the non converged IP messaging client in response to the interactive message communication request, are included in response to the SIP INVITE message, and the IWF transmits the SMS-SUBMIT message to the non converged IP messaging client via a non converged IP messaging server.

10. The server of claim 9, wherein if the IWF receives an acceptance response from the non converged IP messaging client in response to the interactive message communication request message within a response time, the IWF establishes a session for the interactive message communication between the converged IP messaging client and the non converged IP messaging client; and if the IWF receives a rejection response from the non converged IP messaging client in response to the interactive message communication request within the response time, the IWF notifies the converged IP messaging client and the non converged IP messaging client of session establishment failure.

11. The server of claim 10, wherein if the IWF does not receive the acceptance or rejection response from the non converged IP messaging client in response to the interactive message communication request within the response time, the IWF notifies the converged IP messaging client and the non converged IP messaging client of session establishment failure when the response time elapses.

12. The server of claim 11, wherein if the IWF receives the acceptance or rejection response from the non converged IP messaging client in response to the interactive message communication request after the response time elapses, the IWF transmits the acceptance or rejection response to the converged IP messaging client by processing the acceptance or rejection response as a short message.

13. The server of claim 11, wherein if the IWF receives the acceptance or rejection response from the non converged IP messaging client in response to the interactive message communication request after the response time elapses, the IWF discards the acceptance or rejection response.

14. The server of claim 9, wherein when the IWF establishes the session for the interactive message communication between the converged IP messaging client and the non converged IP messaging client, the IWF receives a message from the non converged IP messaging client within the response time, determines whether the message includes a response directive, and if it is determined that the message includes a response directive, determines whether the response directive is an acceptance response directive or a rejection response directive, if it is determined that the response directive is an acceptance response directive, establishes the session for the interactive message communication between the converged IP messaging client and the non converged IP messaging client by transmitting a 200 OK message to the converged IP messaging client and transmitting an SMS-DELIVERY-REPORT message to the non converged IP messaging client, and if it is determined that the response directive included in the message is a rejection response directive, the IWF notifies of session establishment failure by transmitting a 4xx response to the converged IP messaging client and transmitting an SMS-DELIVERY-REPORT message to the non converged IP messaging client, wherein the sentence indicating the interactive message communication request and the response directive is stored in user data.

15. The server of claim 9, wherein the interactive message communication request message includes a response request message for indicating acceptance or rejection to the interactive message.

16. A method of establishing a session for interactive message communication between a converged Internet Protocol (IP) messaging client and a non converged IP messaging client in a converged IP messaging service system, the method of a non converged IP messaging client comprising:

receiving a session establishment request message from an Inter-Working Function(IWF), wherein the session establishment request message includes an acceptance request to an interactive message communication between the converged IP messaging client and the non converged IP messaging client;

displaying a message for indicating an interactive message communication request;

receiving a user's input indicating acceptance or rejection of the interactive message communication responding to the session establishment request message;

transmitting a session establishment request response message including the user's input, wherein the interactive message communication request message comprises a sentence indicating the interactive message communication request and one of a response directive and key information, which must be input by a user of the non converged IP messaging client as an acceptance or rejection in response to the session establishment request message.

17. The method of claim 16, wherein the IWF establishing the session for the interactive message communication between the converged IP messaging client and the non converged IP messaging client further:

receives a message from the non converged IP messaging client within the response time;

determines whether the message includes a header field indicating an acceptance or rejection in response to the interactive message communication request;

if it is determined that the message includes the header field indicating an acceptance or rejection intention, determines whether a value of the header field indicating an acceptance or rejection corresponds to an acceptance response or a rejection response; and establishes, if it is determined that the value of the header field corresponds to an acceptance response, the session for the interactive message communication between the converged IP messaging client and the non converged IP messaging client by transmitting a 200 OK message to the converged IP messaging client and transmitting an SMS-DELIVERY-REPORT message to the non converged IP messaging client.

18. The method of claim 17, further comprising if it is determined that value of the header field corresponds to a rejection response, notifying of session establishment failure by transmitting a 4xx response to the converged IP messaging client and transmitting an SMS-DELIVERY-REPORT message to the non converged IP messaging client.

19. The method of claim 16, wherein the session establishment request message includes a response request message for indicating acceptance or rejection of the interactive message communication.

20. A non converged IP messaging client in a converged IP messaging service system, the non converged IP messaging client comprising;
 a transceiver; and
 a processor for receiving a session establishment request message from an Inter-Working Function (IWF), wherein the session establishment request message includes an acceptance request to an interactive message communication between a converged IP messaging client and the non converged IP messaging client, displaying a message for indicating the interactive message communication request, receiving a user's input indicating acceptance or rejection of the interactive message communication responding to the session establishment request message, and transmitting a session establishment request response message including the user's input,
 wherein the interactive message communication request message comprises a sentence indicating the interactive message communication request and one of a response directive and key information, which must be input by a user of the non converged IP messaging client as an acceptance or rejection in response to the session establishment request message.

21. The non converged IP messaging client of claim 20, wherein the session establishment request message includes a response request message for indicating acceptance or rejection of the interactive message communication.

22. The server of claim 20, wherein the IWF establishes the session for the interactive message communication between the converged IP messaging client and the non converged IP messaging client, the IWF receives a message from the non converged IP messaging client within a response time, determines whether the message includes a header field indicating an acceptance or rejection in response to the interactive message communication request, and if it is determined that the message includes the header field indicating an acceptance or rejection, determines whether a value of the header field indicating an acceptance or rejection corresponds to an acceptance response or a rejection response, and if it is determined that the value of the header field corresponds to an acceptance response, establishes the session for the interactive message communication between the converged IP messaging client and the non converged IP messaging client by transmitting a 200 OK message to the converged IP messaging client and transmitting an SMS-DELIVERY-REPORT message to the non converged IP messaging client.

23. The server of claim 22, wherein if it is determined that the value of the header field corresponds to a rejection response, the IWF notifies of session establishment failure by transmitting a 4xx response to the converged IP messaging client and transmitting an SMS-DELIVERY-REPORT message to the non converged IP messaging client.

\* \* \* \* \*